United States Patent [19]

Usuda

[11] 3,866,511
[45] Feb. 18, 1975

[54] FISHING GILL NET
[75] Inventor: Sadayoshi Usuda, Osaka, Japan
[73] Assignee: Unitika Ltd., Hyogo, Japan
[22] Filed: Jan. 2, 1973
[21] Appl. No.: 320,335

[52] U.S. Cl............................. 87/12, 43/10, 43/14
[51] Int. Cl........................ A01k 73/12, D04g 1/00
[58] Field of Search............................ 87/1, 12, 53; 43/7-14; 51/140 R

[56] References Cited
UNITED STATES PATENTS

| 394,138 | 12/1888 | Shepard | 87/12 X |
| 3,329,061 | 7/1967 | Momoi | 87/12 |
| 3,369,317 | 2/1968 | Brownell | 43/7 |
| 3,507,109 | 4/1970 | Nakazawa | 57/140 R |
| 3,630,117 | 12/1971 | Guy | 87/12 |
| 3,686,381 | 8/1972 | Fairbanks | 87/12 X |

Primary Examiner—John Petrakes
Attorney, Agent, or Firm—Sughrue, Rothwell, Mion, Zinn & Macpeak

[57] ABSTRACT

A fishing gill net made of synthetic fiber yarns whose legs or parts between the knots constituting the meshes thereof, each in parallel or which are specifically loosely entangled but untwisted with one another. In water, depending on these constructions of the filaments composing legs, respective filaments separate from each other and form small meshes between the two knots in addition to ordinary ground meshes between the multiple legs.

10 Claims, 6 Drawing Figures

PATENTED FEB 18 1975 3,866,511

FISHING GILL NET

BACKGROUND OF THE INVENTION

Field Of The Invention

The present invention provides a fishing gill net.

Description Of The Prior Art

A fishing means by using a gill net is a passive one whereby it awaits fish that are caught in the net. Therefore, it is necessary that the existence of the said net is difficulty perceived by fish to be caught and further fish are easily entwined with the meshes of the net and the fish which are stuck in the meshes are entwined therewith and have difficulty in falling off therefrom. Under such consideration, polyamide synthetic fibers, etc., which have a good transparency are utilized as materials for constituting such nets. The conventional gill nets, with reference to FIG. 5, may be explained as follows: each leg 2 between knots 1 comprises a single mono-filament 3, or with reference to FIG. 6, may be explained as follows: each leg 2 between knots 1 comprises regular, plural multi-filaments which are entwisted together to form one strand.

In the former case wherein the leg 2 comprises a single monofilament 3, the transparency of the net in water is superior to the latter net comprising entwisted multi-filaments, while the legs 2 are rather hard and thus the fish catching ability thereof is low, or, that is, the fish stuck to the meshes of the net are difficult to catch in the yarns of the legs 2 and thus easily fall off.

In the latter case, on the other hand, in a net consisting of twisted multi-filaments, the transparency of the net in water is, as mentioned above, inferior to the net consisting of single mono-filament legs and thus any desirable result on fish catching cannot be expected.

SUMMARY OF THE INVENTION

It is a primary object of the present invention to provide a fishing gill net having no defects of the conventional nets mentioned above. More precisely, the present invention provides a fishing gill net in which each leg between the knots constituting the respective inter-leg meshes comprise two to four mono-filaments, each having a size ranging from 30 to 3000 deniers. Each leg is made of parallel nontwisted filament yarn. In water, the leg comprising filaments separate from each other and make small meshes between the filaments for any given leg between the two knots of the ends of the leg in addition to ordinary ground meshes between given legs. These mono-filaments are disposed all in parallel between the said knots, or alternatively, at least one of the mono-filaments is loosely entangled but not entwisted with the other filaments in such manner that the former may easily be distinguished from the latter. The size of each filament may be the same or different.

The fishing gill net according to the present invention is made of parallel nontwisted yarns having double, triple or quadruple filaments, and the filaments each have a size of 30 to 3000 deniers. That is, the legs between the knots of the meshes each consist of parallel or loosely tangled two to four filaments. The present gill net possesses an improved fish catching ability by virtue of not twisting but tangling of the respective filaments constituting the meshes of the net. When the present gill net is actually used, the fish caught in the net may easily and speedily be removed, by hand, etc., to be collected, without any damage of the net. In the actual fishing operation, the present gill net obtains more favorable results not previously attained. Depending upon the kinds of the fish to be caught or the sea areas for fishing operation or, for example, the ocean current state or of the sea water temperature in the said areas, any desirable and appropriate gill net according to the present invention may be used, in which the leg between the knots thereof consists of two to four filaments which are disposed in parallel, or at least one of which filaments is loosely entangled with other remaining filaments in such manner that the former may easily be distinguished from the latter to separate each filament comprising the leg and make leg meshes in water. In any case, the size of the respective filaments may be the same or different. It was actually confirmed that the favorable merits as mentioned above may be attained by the present gill net.

Now, the present invention will be explained more in detail, with reference to the drawings attached hereto.

DESCRIPTION OF PREFERRED EMBODIMENTS

Figure 1:
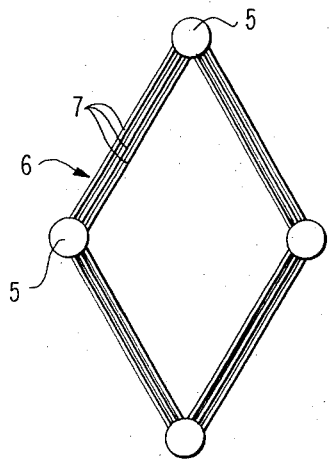
FIG. 1 through FIG. 4 are plan views each showing a yarn constituting of the legs between knots of a fishing gill net according to the present invention.
Figure 2:
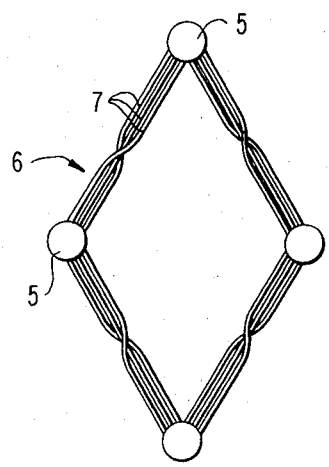
Figure 3:
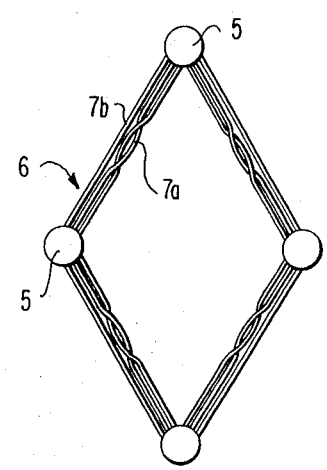
Figure 4:
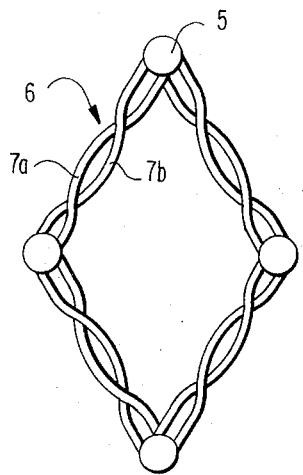
Figure 5:
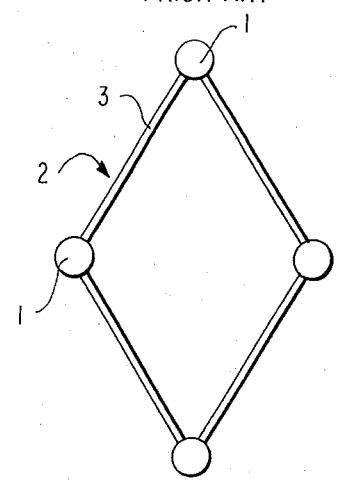
FIG. 5 and FIG. 6 are plan views each showing a yarn constitution of the legs between knots of a fishing gill net according to the prior art.
Figure 6:
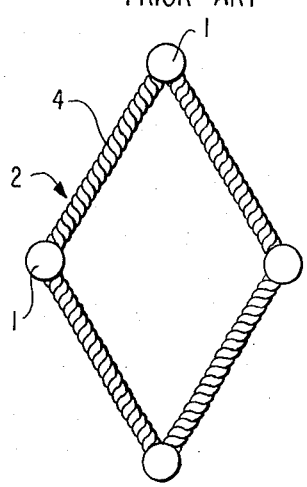

With reference to FIG. 1, legs 6 between knots 5 consist of three mono-filaments 7 such as polyamide mono-filaments which are disposed in parallel. In FIG. 2, the two and three mono-filaments 7 are loosely entangled with one another but not intertwisted. In FIG. 3, two monofilaments 7a which are entangled with one another are disposed in parallel with one mono-filament or two other entangled mono-filaments 7b. In FIG. 4, the said mono-filament groups 7a, 7b are further entangled with each other. In the present case, the number of the synthetic fiber filaments to be used for constituting the legs between the knots must be two to four. If the said filaments are more than the said numbers, although the fish catching ability of the net may somewhat be improved, some defects may occur such that a longer time is required for removing the fish caught in the net and that the damage of the net is apt to be enlarged, which are unfavorable. The filaments may optionally be dyed or colored by means or dyestuffs or pigments.

As explained in the above, the fishing gill net according to the present invention consists of parallel yarns two to four filaments in each of the parts or legs between knots thereof, and these plural filaments are not gathered together to form one twist yarn as in the conventional gill nets consisting of twist yarn of multi-filaments. In the present net, the two to four filaments are in parallel or loosely entangled together and not twisted to separate each filament comprising the leg and to make meshes between two knots in water. This construction only can raise the effect of catching and tangling fish. Thus, the legs of the present gill net have a sufficient flexibility whereby the fish catching ability of the said net is extremely increased due to the improved tangling ability of filaments with the fish. In the present gill net, all of the two to four filaments constituting each leg individually do have such a function as to catch and hook fish, and thus the present net exceeds the conventional nets comprising twist yarns of multi-filaments, in preventing fish from falling off the net. By the use of the present gill net, the effect to prevent fish from falling out of the net may be creatly increased.

The size of the yarn to be used may be made finer by using two to four filaments, which results in an increase of the strong utilization efficiency of the knots and the legs. Thus, the whole size of the yarn constituting the meshes of the net may also be made finer and the weight of the net may be reduced as compared with the conventional nets made of single mono-filament yarn, and therefore, perforation of meshes may be reduced as compared with the conventional nets.

With respect to the transparency of the net, finer denier yarns may be used and the legs are composed by such finer yarn and are disposed in parallel or loosely entangled in order to separate the two to four filaments from one another. Thus, the present gill net is superior in the transparency to the conventional nets of one mono-filament, in that the former is more invisible as compared with the latter. In the present gill net, each filament of the leg is not broken at the same time, and thus the net construction may easily be kept even after a part of the yarns is damaged.

By using the present gill net having the excellent properties as mentioned above, the fish catching ability may greatly be increased, and an excellent catch may be attained.

On the basis of the present invention, a standardized gill net was prepared for the use in northern seas salmon and trout fisheries, and was compared with two conventional nets. The results are shown in the following table. In these cases, the yarns are made of polyamide synthetic fibers.

TABLE

|  | Present Net | Conventional Nets | |
| --- | --- | --- | --- |
|  |  | Mono-filament | Multi-filament |
| Yarn constitution | 660 d/1 × 3 1980 d | No. 9 1980 d | 210 d/24 × 3 × 3 1980 d |
| Size of yarn | 0–1/leg[c] | 0–1/leg[c] | upper part: 315 twists/m lower part: 595 twists/m |
| Mesh size | 121 mm | 121 mm | 121 mm |
| Hook strength in dry state | 13.5 kg | 12.1 kg | 13.3 kg |
| Visible distance[b] in water | 1.8 m | 2.5 m | 4.8 m |
| Flexibility[a] | 540 | 900 | 100 |
| Fish catching ability | 4.6 fishes/tan[d] | 3.7 fishes/tan[d] | 2.1 fishes/tan[d] | a. The testing method for measuring the flexibility is as follows: a yarn piece having a length of 30 mm is stretched between two fulcra having a distance therebetween of 10 mm. In the center of the said yarn is hung a load, whereupon the weight of the load to draw the center of the yarn by 1 mm is measured. The said weight measured in the case of the multi-filament is indicated as a standard index number 100. The other two are the corresponding index numbers.

b. The visible distance in water is measured as follows: the respective net is stretched in a water tank having a size of 15 m (length) × 10 m (width) × 2 m (height). From an eyehole disposed at one end of the water tank the net therein is observed, whereupon the net is gradually moved to keep away the net from the eyehole. The distance between the net and the eyehole is measured when the net is no more visible.

c. Although the filaments themselves are not entwisted, about one or less twist may be formed between the knots when the net is knitted.

d. A Japanese unit [tan] corresponds to about 60 yards (length of net).

As shown in the above results, the fishing gill net of the present invention has a greatly improved high flexibility over the conventional nets consisting of one mono-filament. Depending upon the filaments to be used, moreover, it is possible to increase the flexibility of the present gill net up to that of the gill net consisting of twisted multi-filament yarns. The present gill net also has a greatly improved transparency over the conventional nets. In the above table, one embodiment of the present invention is shown in comparison with the conventional nets. Depending upon the kinds of fishes to be caught, and the methods of fishing operations, the sizes of yarns and the numbers of filaments to constitute the meshes of the net may appropriately be adjusted, whereby suitable flexibility, transparency and strength may be obtained. The present invention thus makes a great contribution in a fishing gill net in that the fish catching ability thereof is greatly improved and that fishes caught in a net are hardly fallen off therefrom.

I claim:

1. In a fishing gill net made of synthetic fiber yarns, the improvement wherein: at least one of the legs betwen the knots constituting the meshes thereof, consists of two to four mono-filaments, each filament having a size of 30–3000 denier, and wherein said filaments extend in parallel or loosely entangled without twist to form leg meshes between knots when immersed in water and ground meshes between knots for multiple legs.

2. A fishing gill net according to claim 1, defining a leg wherein said one leg has at least three filaments in which two of the filaments between the knots are loosely entangled.

3. A fishing gill net according to claim 2, in which the sizes of the filaments are the same.

4. A fishing gill net according to claim 2, in which the sizes of the filaments are different.

5. A fishing gill net according to claim 1 in which the legs consist of loosely entangled filaments and another non-entangled filament.

6. A fishing gill net according to claim 1, in which the legs consist of loosely entangled filaments, each respective filament easily separating from another and making leg meshes between two knots in addition to ordinary ground meshes in water.

7. A fishing gill net according to claim 6, in which between legs the size of the entangled filaments is the same.

8. A fishing gill net according to claim 6 in which the size of the entangled filaments are different.

9. A fishing gill net according to claim 1, in which the yarns are colorless and transparent.

10. A fishing gill net according to claim 1, in which the yarns are dyed.

* * * * *

UNITED STATES PATENT OFFICE
CERTIFICATE OF CORRECTION

PATENT NO. : 3,866,511
DATED : February 18, 1975
INVENTOR(S) : Sadayoshi USUDA

It is certified that error appears in the above-identified patent and that said Letters Patent are hereby corrected as shown below:

IN THE HEADING insert:

Foreign Application Priority Data

December 30, 1971  Japan                5342/72

Signed and sealed this 6th day of May 1975.

(SEAL)
Attest:

RUTH C. MASON
Attesting Officer

C. MARSHALL DANN
Commissioner of Patents
and Trademarks